(12) United States Patent
Eifling et al.

(10) Patent No.: US 7,038,104 B1
(45) Date of Patent: May 2, 2006

(54) CELLULOSE ABSORBENT

(76) Inventors: Boyd R. Eifling, Route 1, Box 242, Hollandale, MS (US) 38748; John H. Ebbers, 2305 E. Lincoln, Brookhaven, MS (US) 39601

( * ) Notice: Subject to any disclaimer, the term of this patent is extended or adjusted under 35 U.S.C. 154(b) by 150 days.

(21) Appl. No.: 09/888,410

(22) Filed: Jun. 26, 2001

(51) Int. Cl.
*A61F 13/15* (2006.01)

(52) U.S. Cl. .................. 604/374; 604/377; 604/367; 119/171; 119/172

(58) Field of Classification Search ............ 604/374, 604/367, 377; 119/171, 172
See application file for complete search history.

(56) References Cited

U.S. PATENT DOCUMENTS

| | | | |
|---|---|---|---|
| 3,617,564 A | 11/1971 | VanderHooven et al. | |
| 4,239,906 A * | 12/1980 | Antrim et al. | 536/56 |
| 4,355,593 A * | 10/1982 | Stapley | 119/171 |
| 4,494,482 A * | 1/1985 | Arnold | 119/173 |
| 4,931,139 A | 6/1990 | Phillips | |
| 5,021,390 A | 6/1991 | Hatton | |
| 5,044,324 A * | 9/1991 | Morgan et al. | 119/171 |
| 5,152,250 A * | 10/1992 | Loeb | 119/171 |
| 5,183,655 A * | 2/1993 | Stanislowski et al. | 424/76.6 |
| 5,188,064 A * | 2/1993 | House | 119/172 |
| 5,207,830 A * | 5/1993 | Cowan et al. | 106/672 |
| 5,254,337 A * | 10/1993 | Marcus et al. | 424/76.1 |
| 5,352,780 A | 10/1994 | Webb et al. | |
| 5,526,770 A * | 6/1996 | Kiebke | 119/171 |
| 5,554,575 A | 9/1996 | Cutler et al. | |
| 5,700,558 A | 12/1997 | Bopp | |
| 5,763,083 A | 6/1998 | Berrigan | |
| 5,807,465 A | 9/1998 | Knapick et al. | |
| 5,951,995 A | 9/1999 | Adamoli et al. | |
| 6,027,652 A | 2/2000 | Hondroulis et al. | |
| 6,092,302 A | 7/2000 | Berrigan | |
| 6,231,660 B1 * | 5/2001 | Welshimer et al. | 106/405 |

* cited by examiner

*Primary Examiner*—John J. Calvert
*Assistant Examiner*—Jacqueline Stephens
(74) *Attorney, Agent, or Firm*—Rothwell Figg Ernst & Manbeck

(57) ABSTRACT

An absorbent and method of making are provided according to the invention. The absorbent in one embodiment includes a fibrous cellulose component, a particulate cellulose component, and a binding agent. The fibrous cellulose component and the particulate cellulose component are intermixed and the binding agent binds the fibrous cellulose component and the particulate cellulose component.

55 Claims, 3 Drawing Sheets

CELLULOSE ABSORBENT

BACKGROUND OF THE INVENTION

1. Field of the Invention

The present invention relates generally to an absorbent, and more particularly to an absorbent formed of a cellulose material.

2. Description of the Background Art

An absorbent (or adsorbent) is a material or compound that absorbs liquids. The absorption is accomplished by spaces or openings in the absorbent or between components of the absorbent, which draw in liquids through capillary or surface tension mechanisms. It is the purpose of an absorbent to draw in and hold liquids. The absorbent and liquids may then be removed, with the absorbent capable of being stored or processed to remove the liquids and even to process the liquids.

Absorbents may therefore be used to clean up spills, pick up liquids, and even to separate different liquids.

Prior art absorbents have typically used or incorporated clay materials. Clay is capable of absorbing many liquids. However, clay has a high density, has a low sorbent capacity, and may generate undesirable dust. In addition, saturated clay-based absorbents may be difficult to dispose of. Moreover, prior art absorbents have typically been formed of materials that require significant processing in order to be formed into an absorbent.

What is needed, therefore, are improvements in absorbents.

SUMMARY OF THE INVENTION

An absorbent is provided according to one embodiment of the invention. The absorbent comprises a fibrous cellulose component and a particulate cellulose component bound together by a binding agent. The fibrous cellulose component and the particulate cellulose component are intermixed and the binding agent binds the fibrous cellulose component and the particulate cellulose component.

A method of making an absorbent is provided according to one embodiment of the invention. The method comprises the steps of mixing a fibrous cellulose component and a particulate cellulose component together to form a mixture and adding a binding agent to the mixture to bind the fibrous cellulose component and the particulate cellulose component.

An absorbent is provided according to another embodiment of the invention. The absorbent comprises a fibrous wood component and a particulate wood component bound together by a binding agent. The fibrous wood component and the particulate wood component are intermixed and the binding agent binds the fibrous wood component and the particulate wood component.

A method of making an absorbent is provided according to another embodiment of the invention. The method comprises the steps of mixing a fibrous wood component and a particulate wood component together to form a mixture and adding a binding agent to the mixture to bind the fibrous wood component and the particulate wood component.

An absorbent is provided according to yet another embodiment of the invention. The absorbent comprises a fibrous cellulose component, with the fibrous cellulose component being selected from the group consisting of wood fibers, fiber pile, chip wash solids, fiber waste, and wood fiber fines. The absorbent further comprises a particulate cellulose component, with the particulate cellulose component being selected from the group consisting of sawdust, wood flour, wood dust, and sander fines. The absorbent further comprises a binding agent, with the binding agent being selected from the group consisting of light weight oil, light weight petroleum oil, mineral seal oil, vegetable oil, and soybean oil. The fibrous cellulose component and the particulate cellulose component are intermixed and the binding agent binds the fibrous cellulose component and the particulate cellulose component.

A method of making an absorbent is provided according to yet another embodiment of the invention. The method comprises the steps of providing a fibrous cellulose component and providing a particulate cellulose component. The fibrous cellulose component may be wood fibers, fiber pile, chip wash solids, fiber waste, or wood fiber fines. The particulate cellulose component may be sawdust, wood flour, wood dust, or sander fines. The method further comprises the steps of mixing the fibrous cellulose component and the particulate cellulose component and adding a binding agent to the mixture to bind the fibrous cellulose component and the particulate cellulose component. The binding agent may be a light weight oil, light weight petroleum oil, mineral seal oil, vegetable oil, or soybean oil.

An absorbent is provided according to yet another embodiment of the invention. The absorbent comprises a fibrous cellulose component, with the fibrous cellulose component being selected from the group consisting of wood fibers, fiber pile, chip wash solids, fiber waste, and wood fiber fines. The absorbent further comprises a particulate cellulose component, with the particulate cellulose component being selected from the group consisting of sawdust, wood flour, wood dust, and sander fines. The absorbent further comprises a binding agent, with the binding agent being selected from the group consisting of soap products and detergents. The fibrous cellulose component and the particulate cellulose component are intermixed and the binding agent binds the fibrous cellulose component and the particulate cellulose component.

A method of making an absorbent is provided according to yet another embodiment of the invention. The method comprises the steps of providing a fibrous cellulose component and providing a particulate cellulose component. The fibrous cellulose component may be wood fibers, fiber pile, chip wash solids, fiber waste, or wood fiber fines. The particulate cellulose component may be sawdust, wood flour, wood dust, or sander fines. The method further comprises the steps of mixing the fibrous cellulose component and the particulate cellulose component and adding a binding agent to the mixture to bind the fibrous cellulose component and the particulate cellulose component. The binding agent may be a soap product or a detergent.

An absorbent is provided according to yet another embodiment of the invention. The absorbent comprises a fibrous cellulose component, with the fibrous cellulose component being selected from the group consisting of wood fibers, fiber pile, chip wash solids, fiber waste, and wood fiber fines. The absorbent further comprises a particulate cellulose component, with the particulate cellulose component being selected from the group consisting of sawdust, wood flour, wood dust, and sander fines. The absorbent further comprises a rice hulls component. The absorbent further comprises a binding agent, with the binding agent being selected from the group consisting of light weight oil, light weight petroleum oil, mineral seal oil, vegetable oil, and soybean oil. The fibrous cellulose component, the particulate cellulose component, and the rice hulls component are intermixed and the binding agent binds the fibrous cellulose component, the particulate cellulose component, and the rice hulls component.

A method of making a drilling mud absorbent is provided according to one embodiment of the invention. The method comprises the steps of providing a fibrous cellulose component, providing a particulate cellulose component, and providing a rice hulls component. The fibrous cellulose component may be wood fibers, fiber pile, chip wash solids, fiber waste, or wood fiber fines. The particulate cellulose component may be sawdust, wood flour, wood dust, or sander fines. The method further comprises the steps of mixing the fibrous cellulose component, the particulate cellulose component, and the rice hulls component. The method further comprises the step of adding a binding agent to the mixture to bind the fibrous cellulose component, the particulate cellulose component, and the rice hulls component. The binding agent may be a light weight oil, light weight petroleum oil, mineral seal oil, vegetable oil, or soybean oil.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
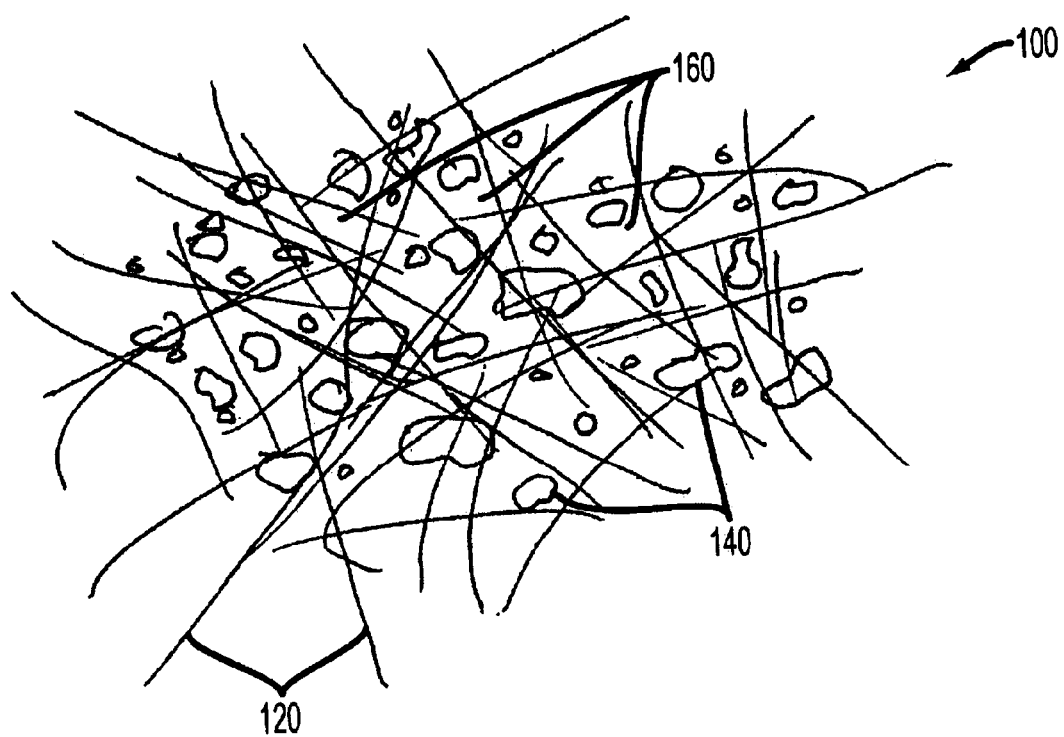
FIG. 1 shows an absorbent according to the invention.

FIG. 1 shows an absorbent 100 according to the invention. The absorbent 100 comprises at least a fibrous cellulose component 120 and a particulate cellulose component 140. The fibrous and particulate cellulose components may be bound together by a binding agent 160.

The fibrous cellulose component is preferably a plant fiber, such as a wood fiber, that is defined as having a length at least three times its diameter.

Wood is a form of cellulose, with cellulose being the chief substance composing the cell walls or woody part of plants. In a more rigorous definition, wood is the tubular remnants of cells, i.e., the secondary xylem comprising dead, hollow xylem cells.

The fibrous cellulose component may include, for example, wood fibers, fiber pile, chip wash solids, fiber waste, wood fiber fines, etc. The fibrous cellulose components may comprise any fibrous cellulose material and may be obtained as a by-product of paper making or other wood processing operations. One source may be a wash of wood or cellulose items as a prelude to being processed. In addition, the fibrous cellulose component may be produced in other ways or obtained from other sources, and may be formed of other plant or cellulose materials, such as a cotton fiber or a cotton lint, for example.

The particulate cellulose components preferably include cellulose material having a length less than three times its diameter. The particulate cellulose component may be formed of cellulose fibers that have been transformed into a substantially particulate form. The particulate cellulose component is therefore substantially particulate in appearance to the naked eye.

The particulate cellulose components are generally produced by processing of wood or wood fiber, such as through cutting, sanding, chopping, etc. The particulate cellulose component may be, for example, sawdust, wood flour, wood dust, sander fines, etc. Wood flour is pulverized dried wood from either soft or hard wood waste and is often used as an extender and filler in dynamite, plastics, rubber, paperboard, polishing agents, etc. Wood dust is wood in a fine or powdered condition. Sander fines are dust-like, minute wood particles.

The binding agent may be any sort of agent that binds the two components together when mixed including, but not limited to, a light weight oil, a light weight petroleum oil, a mineral oil, a mineral seal oil, a vegetable oil, a soybean oil, a soap product, a detergent, etc. The binding agent may additionally be a dust suppressant, substantially preventing the particulate and fibrous cellulose components from becoming airborne. Furthermore, when applied to a floor or other surface, the binding agent may substantially prevent dust from becoming airborne.

Mineral seal oil is a petroleum hydrocarbon distillate that is typically produced as a by-product of petroleum distillation. It is a lighter oil than mineral oil. It is a transparent, colorless or slightly yellow liquid that has a characteristic kerosene-like odor. It also is referred to as hydro-treated middle distillate (petroleum). There are many other terms for mineral seal oil, including petroleum seal oil, severely hydro treated light-middle distillate, highly-refined paraffinic light lube oil, c12–c14 aliphatic and naphthenic hydrocarbons. Other terms are: paraffin oil; heat-treating oil; hydraulic oil; cable oil; lubricating oil; oil mist, mineral; oil mist, refined mineral; oil mist, mineral, severely refined; uvasol; paraffin oils; mineral oil hydrocarbon solvent (petroleum); mineral oil (saturated paraffin oil); oil, petroleum; nujol; liquid paraffin; white mineral oil; clearteck; drakeol; hevyteck; filtrawhite; frigol; kremol; kaydol; alboline; paroleine; saxol; adepsine oil; glymol; lignite oil; blandol white mineral oil; carnea 21; ervol; gloria; hydrocarbon oils; peneteck; primol; triona b; blandlube; crystosol; molol; protopet; bayol f; crystol 325; fonoline; bayol 55; kondremul; neo-cultol; oil mist; penreco; perfecta; petrogalar; primol 355; primol d; tech pet f; petroleum hydrocarbons; jute batching oil; paraffin oil (class); petrolatum, liquid; white oil; mineral oil, aromatic; mineral oil, paraffinic; and electrical insulating oil.

The fibrous and particulate cellulose components may be combined in any ratio effective as an absorbent. The fibrous cellulose component comprises a percentage x ranging from about 1 percent to about 99 percent of the absorbent by volume. The particulate cellulose component comprises a percentage 100-x of the absorbent by volume. The binding agent comprises about 0.05 percent to about 15 percent of the absorbent, and preferably comprises about 1 percent. The absorbent of the invention may be formed of various percentages of each component, from these ranges, selected to total 100 percent.

The absorbent may be used for any application where liquids need to be absorbed, including absorbing and/or removing liquids from a floor or other surfaces, for absorbing liquids mixed in with other liquids, etc. The absorbent may be used to absorb all types of petroleum or petroleum derivatives, including oils, greases, gasoline, diesel, and hydraulic fluids. In addition, it may be used for other liquids, such as antifreeze, water, etc. The fibrous component may aid in holding the absorbent together, and the particulate component fills in spaces between fibers.

After use, the absorbent may be disposed of, including disposal by incineration (depending on the liquid being absorbed, of course). Because the absorbent of the invention is comprised mainly of natural cellulose material, it may be safely incinerated, and if used to absorb a petroleum derivative, the used absorbent may even be used as a fuel source, such as for heating.

In one embodiment, the absorbent may form a general purpose absorbent. For example, the binding agent may be light weight oil, light weight petroleum oil, mineral seal oil, a vegetable oil, a soybean oil, etc. The absorbent preferably comprises about 59 percent fibrous cellulose component, about 40 percent particulate cellulose component, and about 1 percent binding agent.

In another embodiment, the absorbent forms a pet litter for absorbing pet waste. In the pet litter embodiment, the binding agent may be a soap product or a detergent. For example, the binding agent may be liquid or powder soaps and detergents, including hand soaps, dish soaps, laundry detergents, commercial grade soaps, etc., and may comprise a powder, liquid, or granules. Advantageously, the soap or detergent binding agent suppresses odors during use. Preferably, the soap or detergent is scented to more efficaciously suppress odors of the liquid or liquids being absorbed. The pet litter absorbent preferably comprises about 59 percent fibrous cellulose component, about 40 percent particulate cellulose component, and about 1 percent binding agent.

In yet another embodiment, the absorbent may form a drilling mud for use in an oilfield environment. In this embodiment, the binding agent may be light weight oil, light weight petroleum oil, mineral seal oil, a vegetable oil, a soybean oil, etc. In this embodiment, a rice hulls component is added to the absorbent. The rice hulls component becomes sticky when wet, and therefore tends to form a wall around a well casing when used as a drilling mud. The rice hulls component may comprise about 50 percent to about 80 percent of the absorbent. The drilling mud absorbent preferably comprises about 24.5 percent fibrous cellulose component, about 24.5 percent particulate cellulose component, about 50 percent rice hulls, and about 1 percent binding agent.

Figure 2:
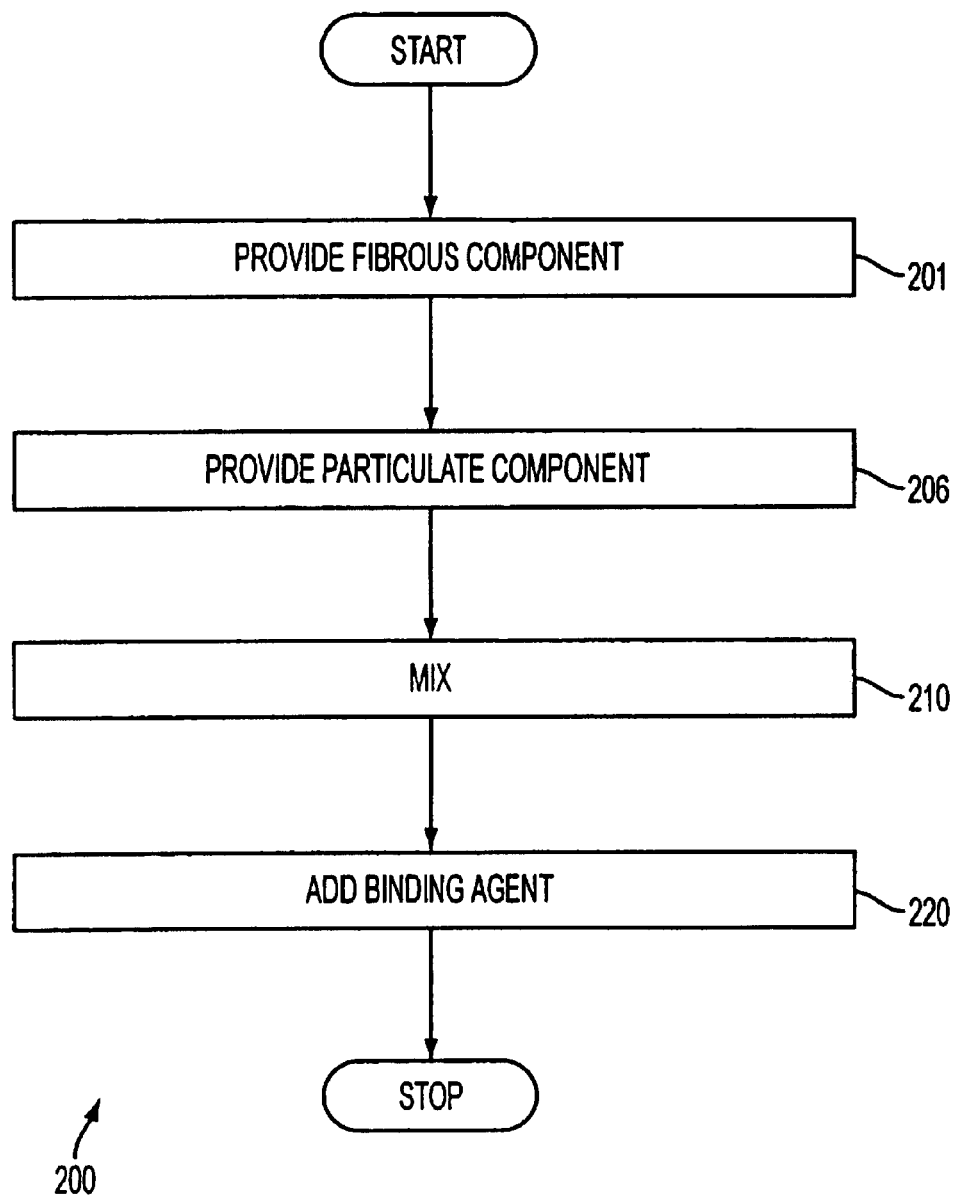
FIG. 2 is a flow chart 200 of a method of making the absorbent.

FIG. 2 is a flowchart 200 of a method of making the absorbent. In step 201, the fibrous cellulose component is provided or obtained. In step 206, the particulate cellulose component is provided or obtained (and optionally a rice hulls component). In step 210 the components are introduced to a blender/mixer that mixes the components. In step 220, a binding agent is added to bind the components. It should be noted that the binding agent may be added to the components before, during, or after the blending or mixing of the components.

The resulting absorbent may be processed in various ways for different applications, such as bagging or packaging the absorbent, forming it into shapes or incorporating it into containers or articles of clothing, extruding in pellet form, etc.

In addition, the method may include optional pre-processing steps, such as screening or cleaning operations. This may be done to ensure a uniform fiber or particulate size and to remove foreign objects. In addition, larger portions may be ground in some manner in order to obtain a substantially uniform component, be it fibrous or particulate.

The method may also include optional post-processing steps, such as a drying step that removes moisture from the absorbent and/or a pelletizing step that forms the absorbent into a predetermined substantially solid shape. The drying may occur before, during or after the blending and mixing process.

Although the invention has been described in terms of a cellulose material, including fibrous and particulate cellulose, in a preferred embodiment the cellulose comprises a fibrous wood component and a particulate wood component. Wood components may be easily obtained as waste products or by-products of wood processing, such as for example, waste products from paper processing mills or lumber mills. The invention not only provides a desirable absorbent, but also consumes and uses waste products. The invention therefore advantageously provides an absorbent that may be manufactured from waste products that might otherwise be dumped in a landfill or disposed of in some other way.

Two absorbent embodiments, the Phase I embodiment and the Phase II embodiment, were evaluated by an independent testing laboratory for effectiveness. The Phase I embodiment comprised about 59 percent fibrous cellulose, about 40 percent particulate cellulose, and about 1 percent binding agent. The binding agent was mineral seal oil. The Phase II embodiment comprised about 59 percent fibrous cellulose, about 40 percent particulate cellulose, and about 1 percent binding agent. The binding agent was mineral oil (heavier than mineral seal oil). The two absorbent embodiments and their component materials were submitted to the Millsaps College Sorbent Laboratory, Jackson, Miss., for sorbency evaluation. Sorbency testing was conducted for three common fluids: 10W-30 motor oil, antifreeze, and #2 diesel fuel, and was based on the Canadian General Standards Board 183.2–94 protocol and the American Society for Testing and Materials F 726-81 protocol. The data for the Phase I embodiment, the Phase II embodiment, the wood flour, and the wood fiber are displayed in Table 1. Table 1 also includes comparative results for several existing absorbent products.

TABLE 1

| | Average Sorbency (in g/g) | | |
|---|---|---|---|
| Product | Antifreeze | 10W-30 Motor Oil | #2 diesel Fuel |
| Phase I | 2.66 | 2.48 | 1.78 |
| Phase II | 1.66 | 1.48 | 1.15 |
| Peat | −2.02 | 7.59 | 6.99 |
| Cellulose | 2.78 | 1.44 | 1.66 |
| Fuller's Earth | 0.89 | 0.43 | 0.63 |
| Diatomaceous Earth | 2.07 | 1.28 | 1.98 |
| SPILL DOCTOR | 5.27 | 2.65 | 4.64 |
| Wood Flour | 1.40 | 2.29 | 1.80 |
| Wood Fiber | 2.62 | 0.95 | 1.34 |

Additional sorbents evaluated included Fuller's Earth, diatomaceous earth, cellulose (recycled paper), peat, and the SPILL DOCTOR commercially available absorbent. Each sample was run in triplicate. The reported sorbency (in grams of fluid adsorbed per grams of sorbent, or g/g) is an average of the three samples. Only two replicates of the Phase I embodiment were tested due to a limited sample.

In all tests, the Phase I embodiment outperformed the Phase II embodiment. Assuming that the relative proportions of the cellulose components were similar, the binding agent of the Phase I embodiment produced more favorable results.

The Phase I sorbency was greater than that of Fuller's Earth, and with the exception of diesel fuel, had greater sorbency than diatomaceous earth. Of the commonly used floor sweep products, SPILL DOCTOR displayed the greatest sorbency values. Relative to the Phase I embodiment, the sorbency of SPILL DOCTOR was approximately 2.5 times greater in diesel fuel and antifreeze. Although the SPILL DOCTOR value was greater, the sorbency values in motor oil were essentially equivalent.

Figure 3:
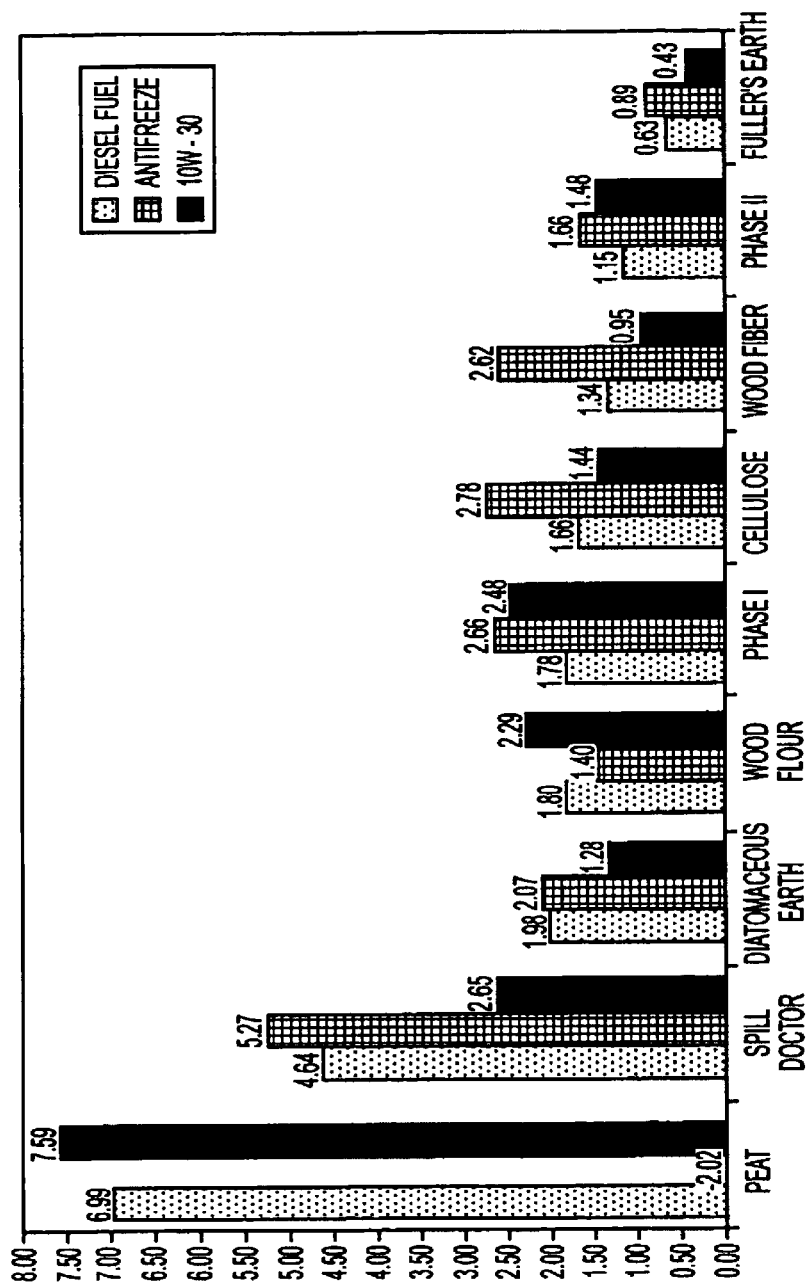
FIG. 3 is a graph that illustrates the sorbency results for all of the tested absorbents and fluids.

FIG. 3 is a graph that illustrates the sorbency results for all of the tested absorbents and fluids. It can be seen that the absorbency of a particular product is relatively constant for the three different test liquids.

SPILL DOCTOR is the most expensive absorbent. It currently costs approximately $1.20 per pound and absorbs roughly 2.58 grams of liquid per gram of absorbent. Diatomaceous Earth currently costs approximately 20 cents per pound and absorbs roughly 1.77 grams of liquid per gram of absorbent. Fuller's Earth currently costs approximately 10 cents per pound and absorbs roughly 0.65 gram of liquid per gram of absorbent. The Phase I embodiment currently costs approximately 0.0937 cents per pound and absorbs roughly 2.3 grams of liquid per gram of absorbent. Therefore, it can be seen that although the absorbent embodiments according to the invention do not achieve a sorbency equivalent to SPILL DOCTOR, for example, they do achieve a good sorbency at a low cost.

It should be understood that although the above-described embodiments are described in relation for use with specific liquids, the various embodiments may be used in other ways, and the above recitations merely serve as illustrations of use and are not limitations.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. An absorbent, comprising:
   a fibrous cellulose component;
   a particulate cellulose component, wherein the particulate cellulose component comprises sander fines;
   and a binding agent;
   wherein said fibrous cellulose component and said particulate cellulose component are intermixed and said binding agent binds said fibrous cellulose component and said particulate cellulose component.

2. The absorbent of claim 1, wherein said fibrous cellulose component comprises wood fibers.

3. The absorbent of claim 1, wherein said fibrous cellulose component comprises fiber pile.

4. The absorbent of claim 1, wherein said fibrous cellulose component comprises chip wash solids.

5. The absorbent of claim 1, wherein said fibrous cellulose component comprises fiber waste.

6. The absorbent of claim 1, wherein said fibrous cellulose component comprises wood fiber fines.

7. The absorbent of claim 1, wherein said particulate cellulose component comprises about 1 percent to about 99 percent of said absorbent.

8. The absorbent of claim 1, wherein said binding agent comprises about 0.05 percent to about 15 percent of said absorbent by volume.

9. The absorbent of claim 1, wherein said fibrous cellulose component comprises about 59 percent, said particulate cellulose component comprises about 40 percent, and said binding agent comprises about 1 percent of said absorbent.

10. The absorbent of claim 1, wherein said fibrous cellulose component comprises about 24.5 percent, said particulate cellulose component comprises about 24.5 percent, said rice hulls comprises about 50 percent, and said binding agent comprises about 1 percent of said absorbent.

11. The absorbent of claim 1, wherein said binding agent comprises a light weight oil.

12. The absorbent of claim 1, wherein said binding agent comprises a light weight petroleum oil.

13. The absorbent of claim 1, wherein said binding agent comprises a mineral oil.

14. The absorbent of claim 1, wherein said binding agent comprises a mineral seal oil.

15. The absorbent of claim 1, wherein said binding agent comprises a vegetable oil.

16. The absorbent of claim 1, wherein said binding agent comprises a soybean oil.

17. The absorbent of claim 1, wherein said binding agent comprises a soap product.

18. The absorbent of claim 1, wherein said binding agent comprises a detergent.

19. The absorbent of claim 1, further comprising a rice hulls component.

20. The absorbent of claim 1, wherein said fibrous cellulose component comprises about 1 percent to about 99 percent of said absorbent.

21. A method of making an absorbent, comprising the steps of:
    mixing a fibrous cellulose component with a particulate cellulose component, wherein said particulate cellulose component comprises sander fines; and
    adding a binding agent to said mixture to bind said fibrous cellulose component and said particulate cellulose component.

22. The method of claim 21, wherein said fibrous cellulose component is selected from the group consisting of wood fibers, fiber pile, chip wash solids, fiber waste, and wood fiber fines.

23. The method of claim 21, wherein said binding agent is selected from the group consisting of light weight oil, light weight petroleum oil, mineral seal oil, vegetable oil, soybean oil, a soap product, and a detergent.

24. The method of claim 21, further comprising the step of providing a rice hulls component, with said rice hulls component being mixed with said fibrous wood component and said particulate wood component.

25. The method of claim 21, further comprising the step of screening said fibrous cellulose component before mixing with said particulate cellulose component.

26. An absorbent, comprising:
    a fibrous wood component;
    a particulate wood component, wherein said particulate wood component comprises sander fines; and
    a binding agent;
    wherein said fibrous wood component and said particulate wood component are intermixed and said binding agent binds said fibrous wood component and said particulate wood component.

27. The absorbent of claim 26, wherein said fibrous cellulose component comprises about 59 percent, said particulate cellulose component comprises about 40 percent, and said binding agent comprises about 1 percent of said absorbent.

28. The absorbent of claim 26, wherein said binding agent comprises about 0.05 percent to about 15 percent of said absorbent.

29. The absorbent of claim 26, wherein said fibrous cellulose component is selected from the group consisting of wood fibers, fiber pile, chip wash solids, fiber waste, and wood fiber fines.

30. The absorbent of claim 26, wherein said binding agent is selected from the group consisting of light weight oil, light weight petroleum oil, mineral seal oil, vegetable oil, soybean oil, a soap product, and a detergent.

31. The absorbent of claim 26, wherein said binding agent comprises a soap product.

32. The absorbent of claim 26, wherein said fibrous wood component comprises wood fibers.

33. The absorbent of claim 26, wherein said fibrous wood component comprises fiber pile.

34. The absorbent of claim 26, wherein said fibrous wood component comprises chip wash solids.

35. The absorbent of claim 26, wherein said fibrous wood component comprises fiber waste.

36. The absorbent of claim 26, wherein said fibrous wood component comprises wood fiber fines.

37. The absorbent of claim 26, wherein said binding agent comprises a detergent.

38. The absorbent of claim 26, further comprising rice hulls.

39. The absorbent of claim 26, wherein said fibrous wood component comprises about 1 percent to about 99 percent of said absorbent.

40. The absorbent of claim 26, wherein said particulate wood component comprises about 1 percent to about 99 percent of said absorbent.

41. The absorbent of claim 26, wherein said binding agent comprises a light weight oil.

42. The absorbent of claim 26, wherein said binding agent comprises a light weight petroleum oil.

43. The absorbent of claim 26, wherein said binding agent comprises a mineral seal oil.

44. The absorbent of claim 26, wherein said binding agent comprises a vegetable oil.

45. The absorbent of claim 26, wherein said binding agent comprises a soybean oil.

46. A method of making an absorbent, comprising the steps of:
providing a fibrous wood component;
providing a particulate wood component, wherein said particulate wood component comprises sander fines;
mixing said fibrous wood component and said particulate wood component; and
adding a binding agent to said mixture to bind said fibrous wood component and said particulate wood component.

47. The method of claim 46, with said fibrous wood component being selected from the group consisting of wood fibers, fiber pile, chip wash solids, fiber waste, and wood fiber fines.

48. The method of claim 46, with said binding agent being selected from the group consisting of light weight oil, light weight petroleum oil, mineral seal oil, vegetable oil, soybean oil, a soap product, and a detergent.

49. The method of claim 46, further comprising the step of providing a rice hulls component, with said rice hulls component being mixed with said fibrous wood component and said particulate wood component.

50. The method of claim 46, further comprising the step of screening said fibrous cellulose component before mixing with said particulate cellulose component.

51. A method for absorbing liquids comprising applying an absorbent which comprises a fibrous cellulose component, a particulate cellulose component and a binding agent to a liquid to absorb said liquid, wherein said particulate cellulose component comprises sander fines.

52. The method of claim 51, wherein said fibrous component is selected from the group consisting of wood fibers, fiber pile, chip wash solids, fiber waste and wood fiber fines.

53. The method of claim 51, wherein said binding agent is selected from the group consisting of light weight oil, light weight petroleum oil, mineral seal oil, vegetable oil, soybean oil, a soap product and a detergent.

54. The absorbent of claim 1, wherein said fibrous cellulose component is selected from the group consisting of wood fibers, fiber pile, chip wash solids, fiber waste, and wood fiber fines.

55. The absorbent of claim 1, wherein said binding agent is selected from the group consisting of light weight oil, light weight petroleum oil, mineral seal oil, vegetable oil, soybean oil, a soap product, and a detergent.

* * * * *